United States Patent [19]
Wheatley et al.

[11] 4,078,317
[45] Mar. 14, 1978

[54] FLIGHT SIMULATOR SYSTEM

[76] Inventors: Ronald B. Wheatley, 1280 21st St., NW., Washington, D.C. 20036; John P. McGuire, 9300 Persimmon Tree Rd., Potomac, Md. 20854

[21] Appl. No.: 710,320

[22] Filed: Jul. 30, 1976

[51] Int. Cl.² .......................... G09B 9/08; H04N 7/18
[52] U.S. Cl. ................................... 35/12 N; 35/12 F; 358/104
[58] Field of Search .................. 35/11 R, 11 A, 12 R, 35/12 F, 12 L, 12 N, 12 W, 10.2, 25; 273/1 E, 85 R, DIG. 28; 340/324 A, 324 AD; 358/104

[56] References Cited
U.S. PATENT DOCUMENTS

| | | | |
|---|---|---|---|
| 2,455,992 | 12/1948 | Goldsmith et al. | 273/DIG. 28 |
| 3,046,676 | 7/1962 | Hermann et al. | 35/25 |
| 3,081,557 | 3/1963 | Mailhot | 35/12 N |
| 3,327,407 | 6/1967 | Barnes | 35/12 N |
| 3,471,627 | 10/1969 | Ziegler | 35/12 W X |
| 3,539,696 | 11/1970 | Sweeney et al. | 35/12 N X |
| 3,659,284 | 4/1972 | Rusch | 273/DIG. 28 |
| 3,729,129 | 4/1973 | Fletcher | 35/12 F UX |
| 3,829,095 | 8/1974 | Baer | 273/DIG. 28 |
| 3,871,113 | 3/1975 | Crago et al. | 35/10.2 |
| 3,874,669 | 4/1975 | Ariano | 273/DIG. 28 |

Primary Examiner—Richard C. Pinkham
Assistant Examiner—Vance Y. Hum
Attorney, Agent, or Firm—Roylance, Abrams, Berdo & Kaul

[57] ABSTRACT

A flight simulator having an operator console, a conventional television receiver and one or more transparencies which are overlaid on the face of the television receiver. Electronic signals, generated by circuits housed in the operator console, produce an illuminated display on the television receiver including movable symbols representing the simulated aircraft, and fixed symbols representing environmental features such as landing fields. Controls on the console permit an operator to "fly" the aircraft symbol from, around and to the fields. Two modes of operation are provided, one simulating cross-country flight and the other, employing an enlarged scale representation, simulating takeoff and landing conditions. The overlay includes other fixed environmental features such as mountains. The display is divided into two portions, one in elevation and the other in plan, with aircraft symbols being concurrently visible in each portion.

17 Claims, 16 Drawing Figures

TV DISPLAY
ENROUTE SECTOR

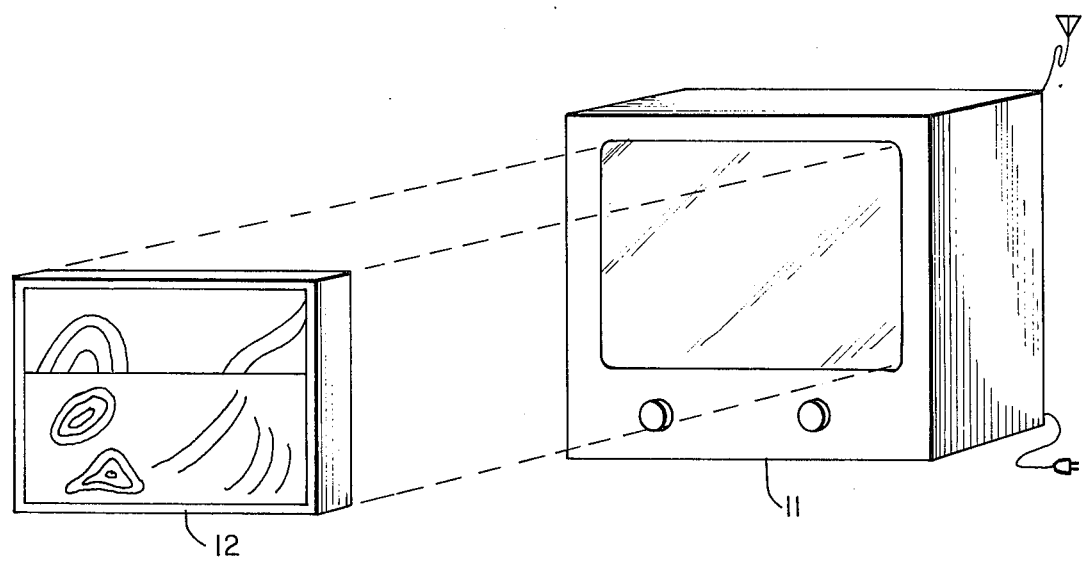
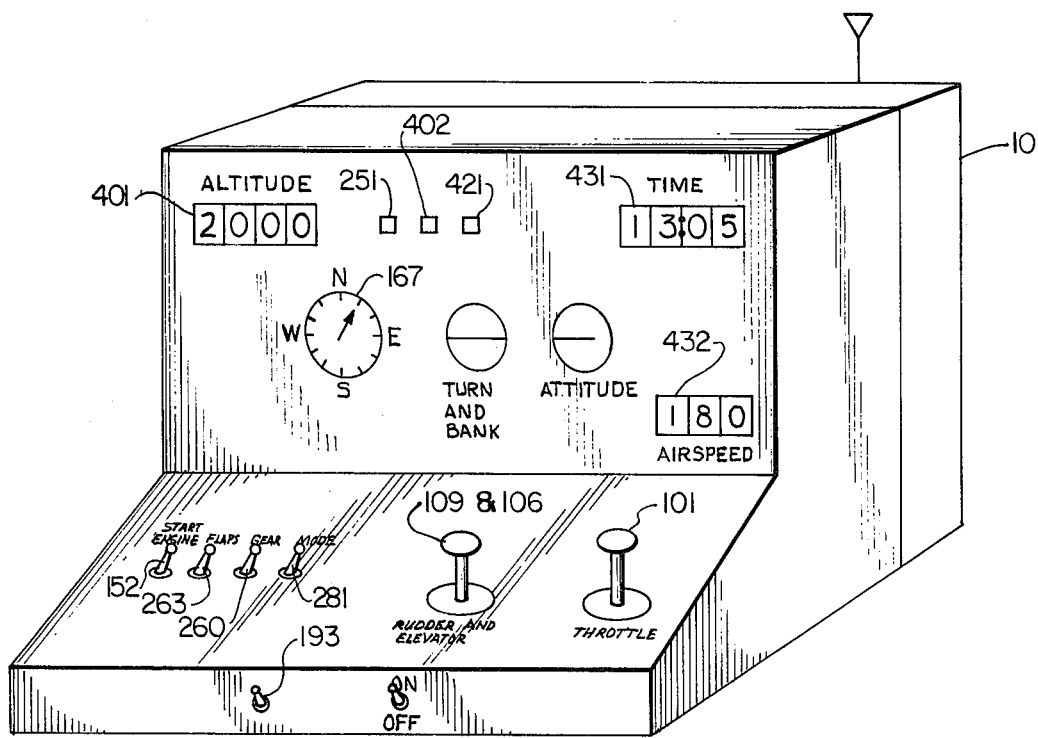
FIG. 1

*OVERLAY*

*TV DISPLAY
ENROUTE SECTOR*

*TV DISPLAY
TAKE OFF & LANDING*

SIMPLIFIED BLOCK DIAGRAM
OF OPERATOR CONSOLE

TV SIGNAL GENERATOR

DETAILED BLOCK DIAGRAM
OF AIRCRAFT SIGNAL GENERATOR

LANDING STRIP GENERATOR

TIMING SIGNALS
LANDING STRIP GEN.

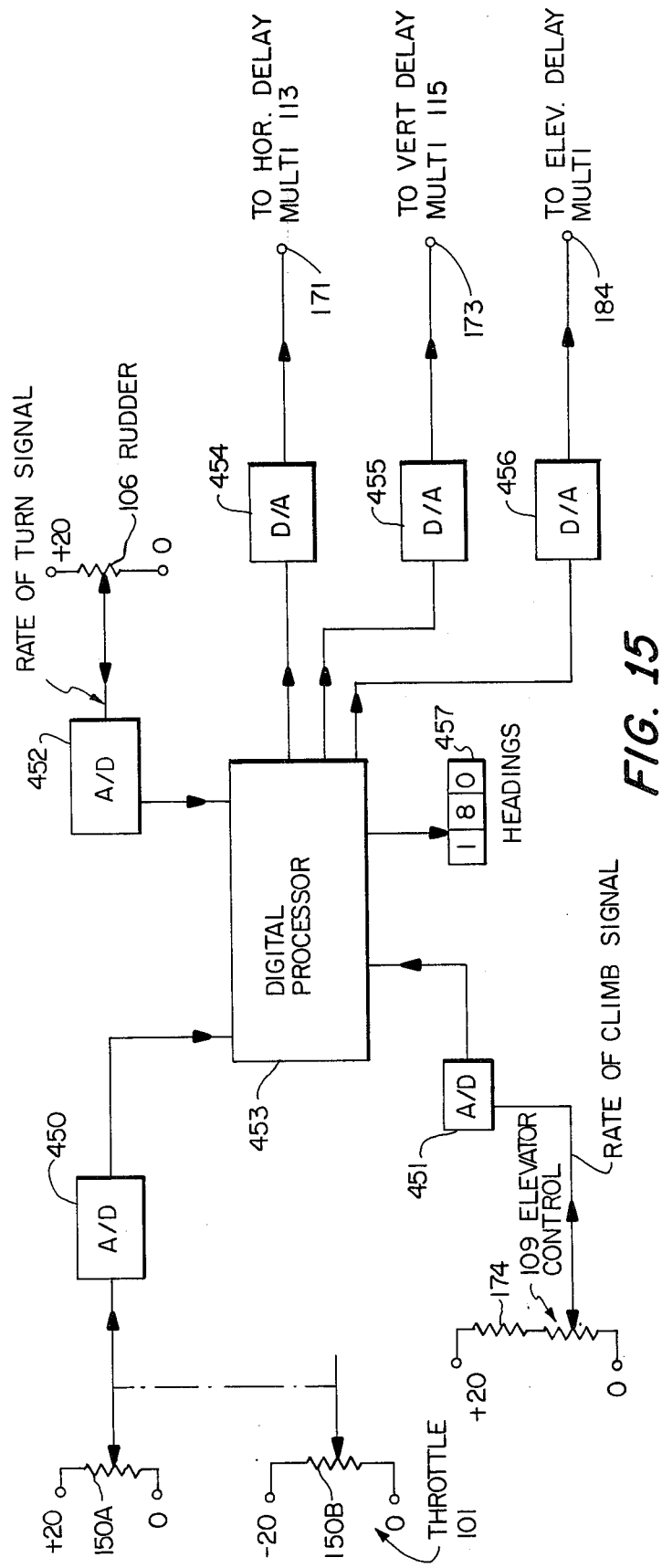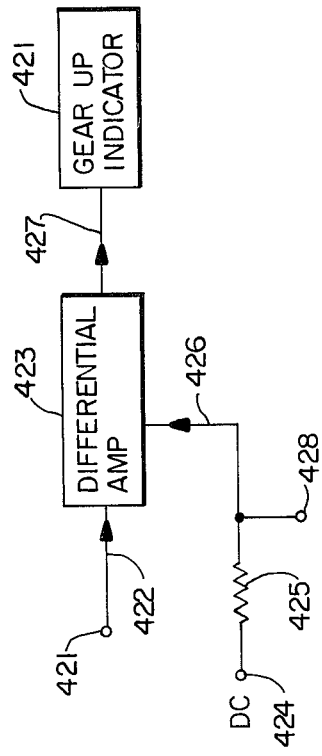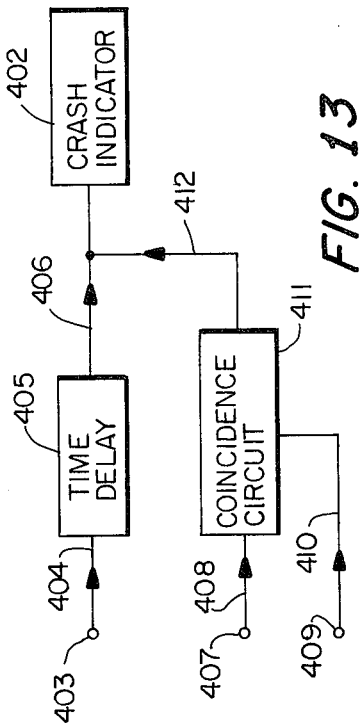
FIG. 15
FIG. 14
FIG. 13

FLIGHT SIMULATOR SYSTEM

This invention relates to apparatus for simulating aircraft flight and, more specifically, to a system for providing a visible and controllable display of a simulated aircraft so that an operator can perform various flight sequences and solve flight problems in a realistic fashion.

In recent years, several manufacturers have recognized and taken advantage of the fact that standardized television receivers are widespread and are readily available. While these receivers vary widely in quality, price, sophistication and features, they are nevertheless standardized in their basic design parameters and are therefore capable of receiving signals from any of various sources, such as different television signal transmitters, and of producing displays of substantially uniform good quality. Recognizing these facts, the manufacturers have produced games of a variety of kinds and in varying degrees of sophistication wherein one or more control units are connected to the receiver to produce (on some otherwise unused channel to which the receiver selector is turned) a display of the game with both fixed and moving elements. The moving elements are controllable, to a limited degree, by the operation of switches or the like on the control units.

The present invention is based on a recognition of the fact that such games make use of only a very limited amount of the capacity of the display medium of the television receiver and of the further fact that the receiver can be used as the display portion of a system which extends somewhat beyond the level of a simple game.

Still further, it is recognized that the field of flying, particularly model aircraft flying using radio controlled models, is an occupation which is restricted by weather and other conditions, and which requires some level of training and experience. It has usually been the case that one gains such experience of actually building and flying a model airplane and it is common for the first one or more models to be lost or damaged until the operator gains experience.

An object of the present invention, therefore, is to provide an apparatus which employs a conventional television receiver as the display portion and which provides a training apparatus to realistically simulate the flight of an aircraft, particularly model aircraft.

A further object is to provide controllable means for producing a television display having two portions, one representing aircraft movement in vertical planes and the other simultaneously representing movement of the aircraft in horizontal planes as the aircraft would be viewed from the side and from above, respectively.

Another object is to provide a system of the foregoing type in which a change of scale of the display can be accomplished to permit realistic representation of flight in an "en route sector" mode for cross-country flight and, at an enlarged scale, realistic representation of flight in a takeoff and landing mode, both including display of simulated landing strips.

While the system to be described is presented in the context of simulating the flight of a model aircraft, it will be recognized that it involves many of the principles of flight of a true aircraft and, as such, also permits one to learn flight procedures and principles of aircraft handling, in general.

Briefly described, the invention includes an apparatus for use in combination with a television receiver for producing a controllable display simulating the flight of an aircraft comprising control means coupled to the receiver for producing signals to which said receiver is responsive to produce fixed and movable display marks on the screen, the control means including sync circuit means for generating vertical and horizontal sync signals consistent with the raster pattern of the receiver, first circuit means for generating signals to which the receiver is responsive to produce on the screen first and second symbols representative of an aircraft with one of the symbols being displayed in the upper portion and the other in the lower portion, second circuit means for generating signals to which the receiver is responsive to produce on the screen third and fourth symbols representative of a landscape feature, the third and fourth symbols being displayed respectively in the upper and lower portions, the first circuit means including variable circuit means for changing the time of generation of the signals to concurrently change the horizontal location of said first and second symbols to produce the appearance of motion of said symbols in a horizontal direction, and to independently change the vertical locations of the first and second symbols in the upper and lower portions, and manually movable control means mechanically coupled to the variable circuit means for enabling an operator to control the direction of movement of said first and second symbols. A transparent overlay attachable to the display screen of the receiver to substantially cover the screen can also be provided, the overlay having indicia thereon dividing the screen into said upper portion and said lower portion.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a perspective view schematically showing the major components of a flight simulator system in accordance with the invention;

FIGS. 8 and 8A are partial schematic diagrams, partly in block form, of the east-west, north-south and elevation computer portions of the aircraft signal generator shown in both FIGS. 5 and 7;

Figure 11:
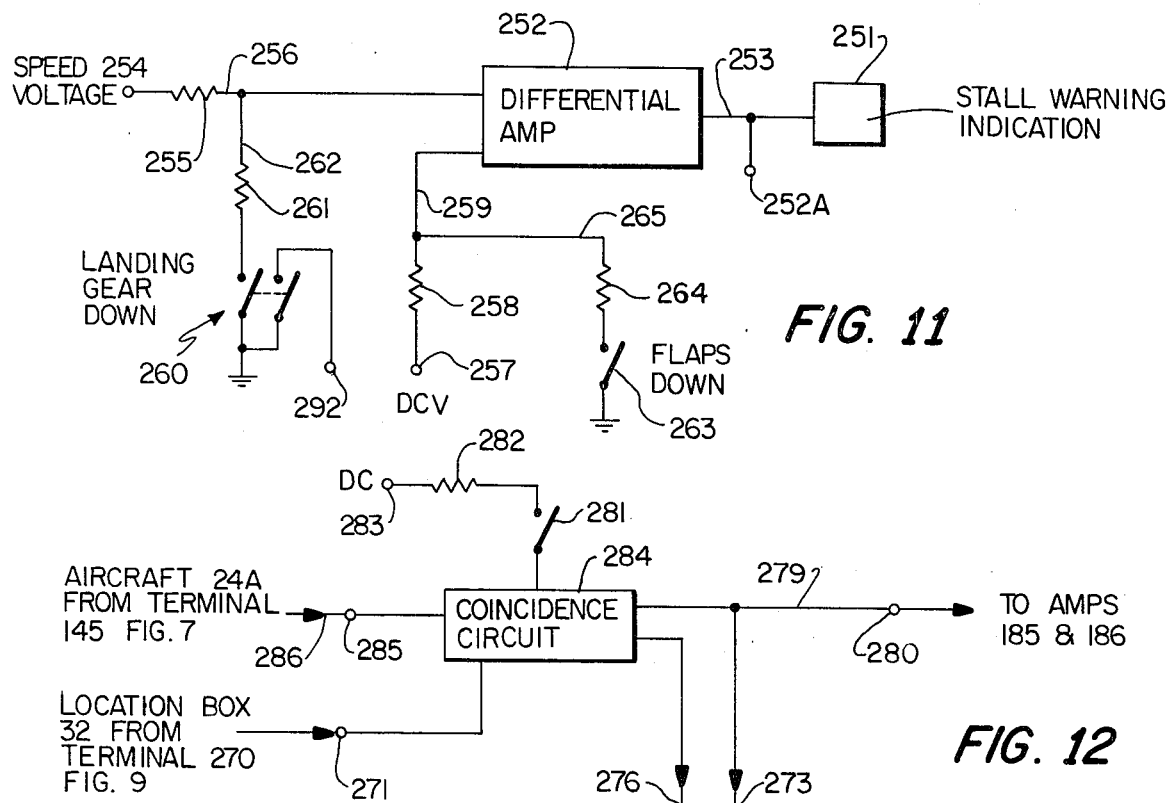
Figure 12:
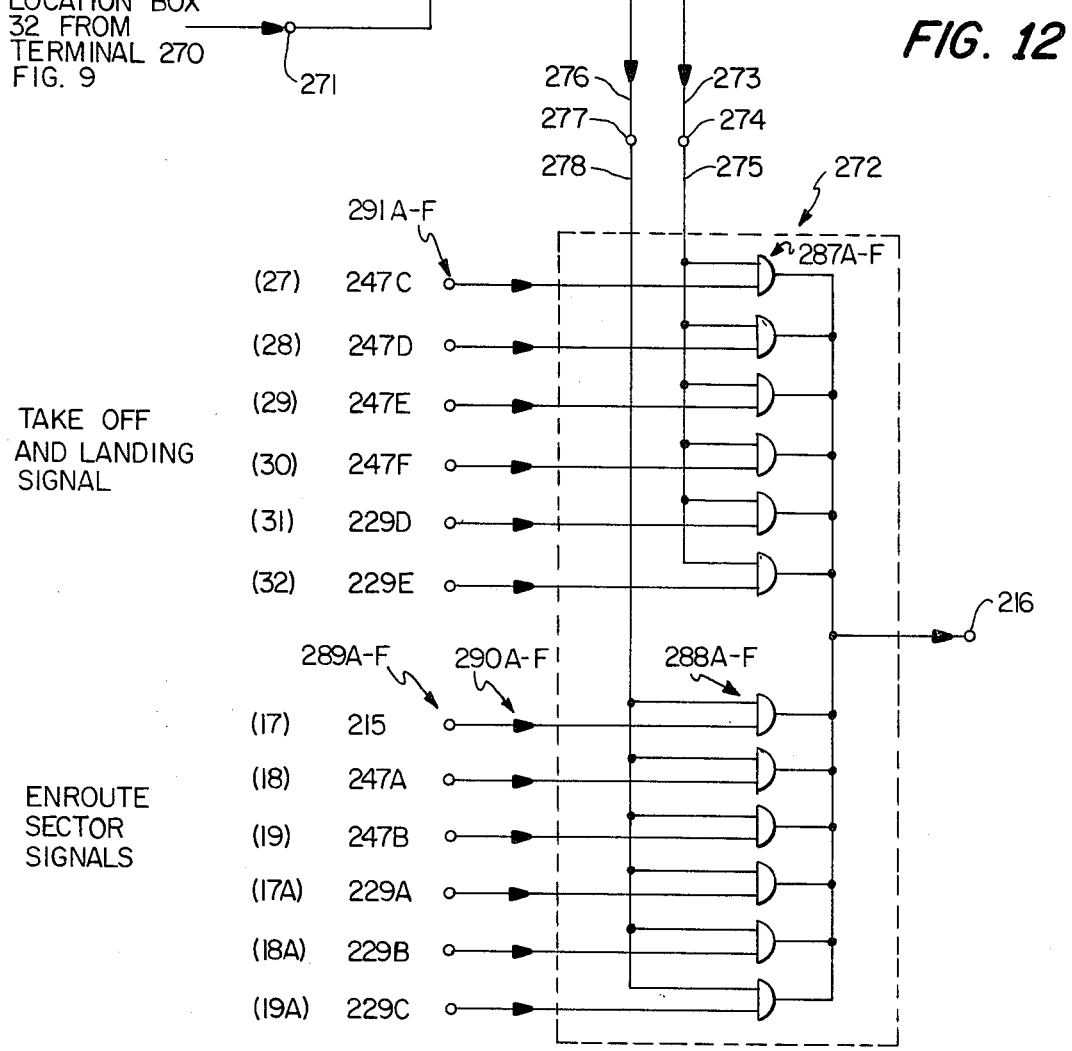

FIGS. 10A-K are explanatory waveform and timing diagrams of waveforms which appear in the system of FIGS. 1-9;

FIG. 11 is a schematic circuit diagram, partly in block form, of the stall warning circuit;

FIG. 12 is a schematic circuit diagram, partly in block form, of mode control circuits usable in the system;

FIGS. 13 and 14 are schematic diagrams, partly in block form, of a crash indicator circuit and a "gear up" indicator circuit, respectively; and FIG. 15 is a schematic diagram in block form for digitally processing aircraft signals.

The instruments and displays, located on the console and arranged for use by the pilot operator are divided into four groups in accordance with their functions.

The first group includes the controls which permit the operator to set in the initial conditions of the aircraft prior to the start of a simulated flight. Among these controls are included, for example, the controls which determine the initial location and heading of the aircraft.

The second group includes devices on the console which permit the operator to control the aircraft flight. Console controls which simulate the aircraft ailerons, rudder and elevator are included in this group.

The third group includes those devices which permit navigation of the aircraft. These include such instruments and displays as altimeter, clock and aircraft attitude.

Miscellaneous devices such as a "power on" switch for the simulator and crash alarm are included in the fourth group.

The flight simulator operates in two basic modes which are identified as the en route mode and the takeoff and landing mode. In each of the modes the television display as seen by the pilot operator is divided into an upper and a lower section. The upper one-third of the display always portrays the flight of the aircraft with the vertical axis representing elevation of the aircraft and with the horizontal axis representing the east-west range of the aircraft. The lower two-thirds of the television display, in each mode of operation, portrays the flight of the aircraft with the vertical axis representing north-south range and the horizontal axis representing east-west range. Thus, the lower two-thirds section of the display is a conventional plan or map-type view of the aircraft as it travels over the landscape.

Referring now to FIG. 1, a preferred embodiment of the flight simulator includes an operator control unit indicated generally at 10, a black-and-white or color television receiver 11 having a standard raster display and a transparent overlay 12 for the television receiver. The operator control unit 10 houses the aircraft operational controls, navigational instruments and indicating lights for operation of the simulated aircraft and in addition houses all of the electronics for generating the aircraft and other displays on the television receiver. A typical arrangement of these controls and indicators is illustrated in FIG. 1, and the function of each of these devices including its operational purpose, its influence on the electronic circuits and its effect on the television raster display will be described hereinafter.

Figure 2:
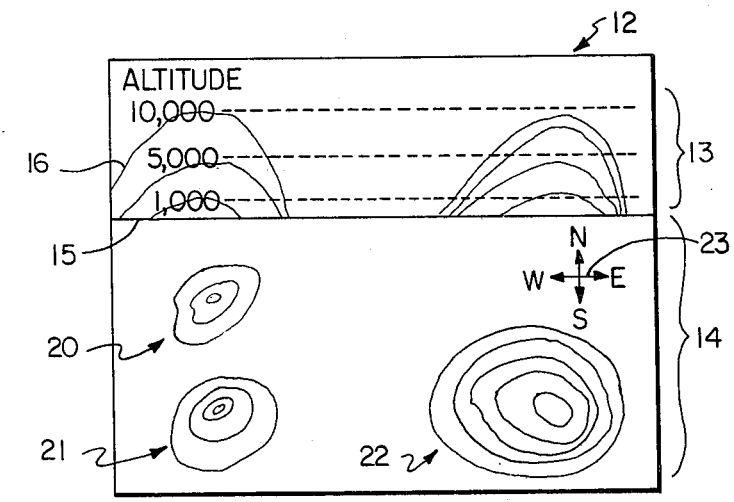
FIG. 2 is a more detailed illustration of a transparent overlay usable with the television receiver of FIG. 1.

FIG. 2 shows further details of a typical transparent overlay 12 which includes provisions such as marginal adhesive zones or VELCRO or other mechanical clips, not shown, for attaching the overlay to the television receiver. The overlay shows in its upper one-third an elevation section 13 and in its lower two-thirds section 14 a map or plan view with a horizontal dividing line 15 between the two sections. With respect to the upper elevation section 13, the line 15 represents zero altitude and three additional lines are identified as 1,000; 5,000 and 10,000 feet of altitude. The altitudes are marked at the extreme left-hand side of the overlay.

Also shown on both the left- and right-hand sides of the overlay are topographical lines, of which a typical one is identified as 16 in FIG. 2. These topographical lines describe features such as hills and mountains of the landscape and represent obstacles about which the pilot operator must fly his aircraft. Since the elevation display plots increasing elevation towards the top of the figure and range to the right and left, the topographical lines 16 on the upper display portray mountains as they would be seen by an observer looking horizontally toward the mountains from a distance. It will be recognized that similar overlays exhibiting other landscape features can be provided. However, only one will be discussed herein.

Figure 3:
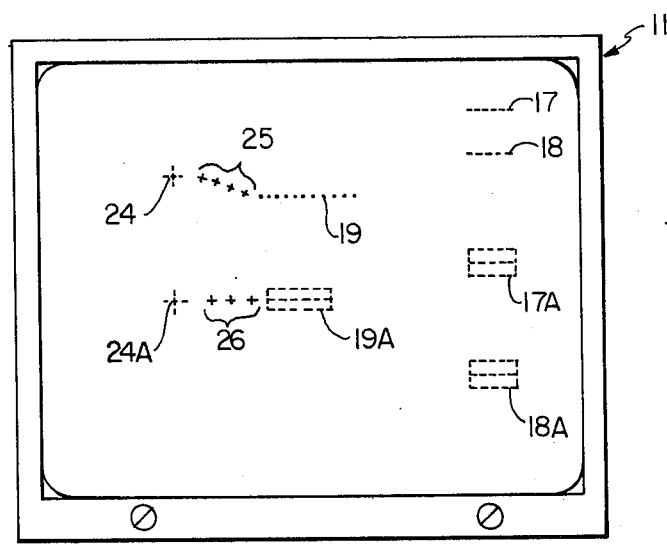
FIG. 3 is a schematic illustration of a typical television display when the flight simulator is operating in the en route sector mode.

With the overlay 12 installed on the television receiver 11, as shown in FIG. 3, one can observe the three horizontal landing strips 17, 18 and 19 which are part of the video display presented on the face of the receiver, and which are visible through the transparent overlay 12. Thus, the landing strip 19 would appear on the overlay at an altitude of approximately zero feet while the landing strips 18 and 17 would appear at altitudes of approximately 1,000 and 6,000 feet, respectively.

Looking now at the plan view display which is the lower two-thirds section 14 in FIG. 2, there are shown three mountainous regions 20, 21 and 22. These mountains would appear on the overlay as they would to an observer looking downwardly from an extremely high altitude. Visualizing the overlay 12 located on the front of the television receiver as shown in FIG. 3, it can be seen that the landing field 19a, which is the plan view of the same field shown in the upper portion at 19, would be situated at zero elevation while landing field 17a would be on the side of the mountain range 22 and landing field 18a will be at the top of the mountain range 22, fields 17a and 18a being the same fields as 17 and 18. Also appearing on the overlay 12 as shown in FIG. 2 is a simple compass rose 23 provided for the use by the pilot-operator.

Figure 4:
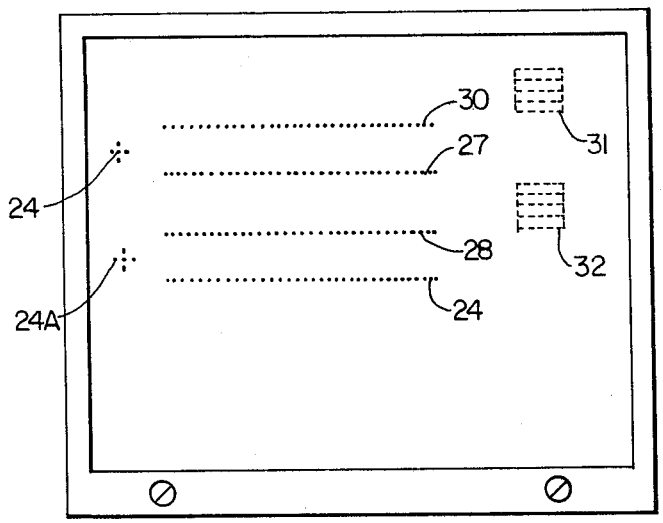
FIG. 4 is a schematic illustration of the television display when the flight simulator is operating in the takeoff and landing mode.

FIGS. 3 and 4 are drawings of the television receiver 11 with the illuminated portion of the video display shown as dotted lines. The use of dotted lines in the drawings is merely for the purpose of identifying those illuminated portions of the video which are to be visible to the observer as he operates the system. However, these portions, as actually produced on the screen and as seen by an observer of the TV raster may be either dotted, dashed or solid lines. In FIG. 3 the dotted lines show the landing fields as they would appear to the operator with the flight simulator operating in the en route sector mode while FIG. 4 shows the video signals as they would appear to the operator with the flight simulator operating in the takeoff and landing mode. In both modes of operation the TV display is divided into an upper elevation sector and into a lower plan view section by means of the horizontal line 15 provided on the overlay.

As previously described and as shown in FIG. 3, the upper third of the television display portrays increasing elevation in the vertical direction and portrays increasing east and west range to the right and left, respectively. Illuminated lines 17, 18 and 19, which are produced by video signals generated by the electronic circuits of the operator control unit 10, represent landing strips at altitudes of 6,000 feet, 1,000 feet and sea level, respectively. Video signal 24, also generated by the electronic circuits of control unit 10, represent the aircraft which is shown as a small dot, in the preferred embodiment. The aircraft may also be displayed in the form of a cross, an arrowhead or a small aircraft symbol, the choice being limited only by the nature and complexity of the electronic circuits. The motion of the aircraft 24 as it moves across the television display is controlled by the pilot-operator as he manipulates the ailerons and rudder controls on the control panel of the operator control unit 10. As an example, if the aircraft is flown in a generally easterly direction, and if the elevator control is pushed forward to cause the aircraft to fly in a descending manner, the aircraft 24 will appear on the television display as seen by the viewer to follow the track of the small crosses 25 and merge with or land on the landing strip 19.

At the same time the aircraft 24 is observed on the upper elevation display screen, the same aircraft represented by symbol 24a is seen on the lower plan view display.

As mentioned previously the lower plan view display plots increasing east range to the right, increasing south range toward the bottom of the display, increasing west range to the left and increasing north range in an upward direction. Thus, by proper manipulation of the aircraft rudder control, the aircraft may be moved from its present location as illustrated at 24a to the right, in an easterly direction, until it coincides with the landing strip 19a. This path is shown generally by the series of crosses 26. It should be carefully noted that in regard to left-right position, or east-west range, aircraft symbols 24 and 24a always track, that is, aircraft 24 is always seen directly above aircraft 24a.

When the aircraft has been flown to the proper position, as shown in both the elevation and plan displays, so that a landing may be undertaken, the display may be switched either manually or automatically from the en route sector mode of display to the takeoff and landing mode of display. A description of the circuits which provide the switching from one mode to the other will be described hereinafter.

The takeoff and landing mode display of the flight simulator as seen on the television screen by the pilot-operator is shown in FIG. 4. In the takeoff and landing mode the display remains divided into an upper section representing elevation in east-west range and a lower two-thirds plan view representing east-west and north-south range. However, the scale of the display is changed so that a somewhat smaller geographic region is visible and, therefore, each feature of interest during landing, particularly the landing strip, is shown in somewhat enlarged form. In the upper elevation sector display the landing strip is represented by an illuminated line 27. It is the object of the pilot to manipulate the controls of the aircraft so that the aircraft 24 is maneuvered in range and elevation so that it appears to land on landing strip 27. At the same time the pilot is observing the aircraft 24 on the elevation display he can also observe the aircraft 24 on the plan view display. It is the object of the pilot to manipulate the east-west and north-south course of the aircraft so that the aircraft symbol 24a flies between the two lines 28 and 29 representing the lateral boundaries of the flight strip. Circuits are provided which will be described hereinafter that generate a warning signal if the aircraft 24a intersects either of the lines 28 and 29 which outline the boundaries of the airstrip. In a similar manner an additional line 30 located at a predetermined elevation above the landing strip surface 27 on the elevation display has been provided so that a warning signal may be provided if the aircraft 24 is not properly flown.

To this point there have been described the television display and the manipulation of the aircraft as it was flying in the en route sector and when approaching and landing at the landing strip. During takeoff the displays operate in a similar fashion with an additional goal provided. It is customary when piloting an aircraft that, after reaching a particular altitude, the aircraft makes an abrupt turn to leave the vicinity of the airport and permit other aircraft to land and take off. Boxes 31 and 32 outline a "window" which defines the proper elevation and range for the aircraft when taking off. Circuits which will be described hereinafter are provided to perform the function of automatically switching from the takeoff display mode to the en route sector display mode if the aircraft is properly flown through both boxes 31 and 32.

Figure 5:
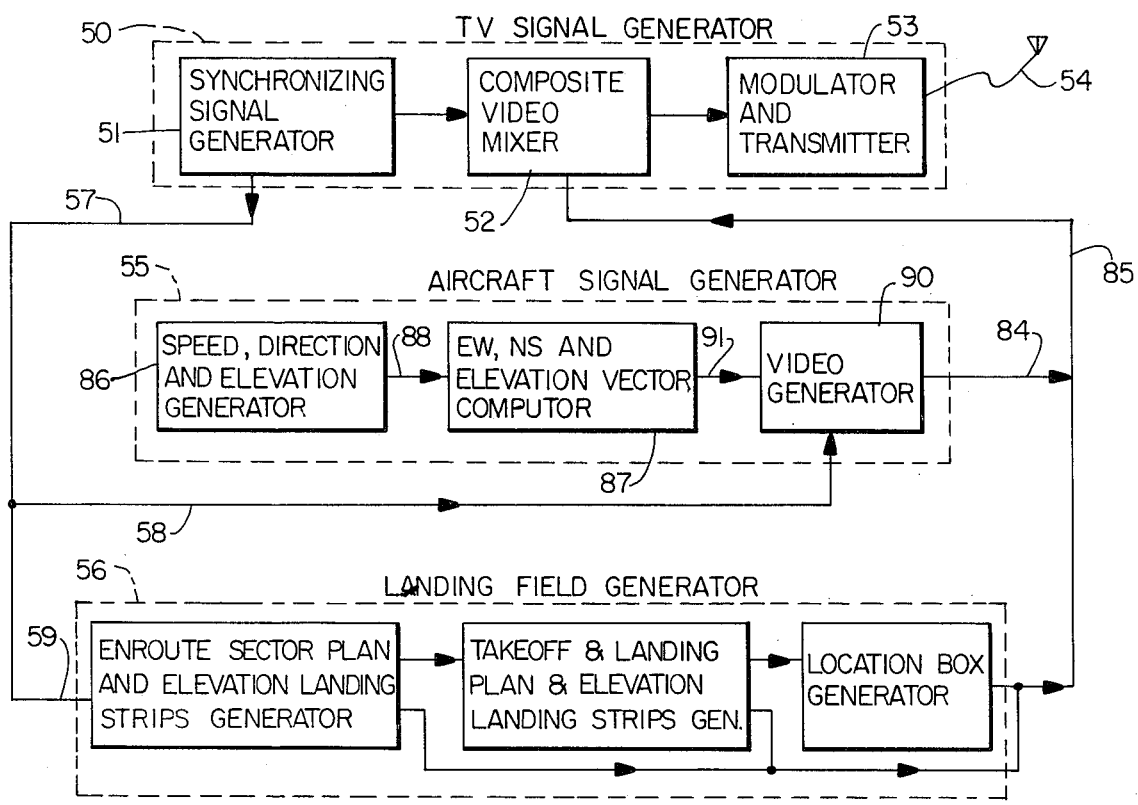
FIG. 5 is a simplified schematic diagram in block form of the operator console.

FIG. 5 is a simplified block diagram of the circuits of the operator console. The first function of the circuits of the flight simulator is to produce standard horizontal, vertical and video signals which can be transmitted to the television receiver both to synchronize the raster display and to provide the video which illuminates the television display. In effect these signals substitute for the signals produced by a conventional television camera, modulator and transmitter and are thus well known and understood. In addition, similar techniques are frequently used in television signal generators such as color bar generators. An example of apparatus of this general type can be found in U.S. Pat. No. 3,586,755, Wlasuk, issued June 22, 1971. As shown in FIG. 5, a television signal generator 50 includes a synchronizing (sync) signal generator 51 which produces both the horizontal and vertical sync signals. These horizontal and vertical signals are mixed with the video by a composite video mixer 52 and transmitted to the antenna of the television receiver by the modulator and transmitter 53 via the signal generator antenna 54.

The same vertical and horizontal sync signals produced by the signal generator 51 that are used to synchronize the television receiver are also used to synchronize the circuits of the aircraft signal generator 55 and the landing field generator 56. The sync signals are conducted from the synchronizing signal generator 51 to the aircraft signal generator 55 and the landing field generator 56 via paths 57, 58 and 59.

Figure 6:
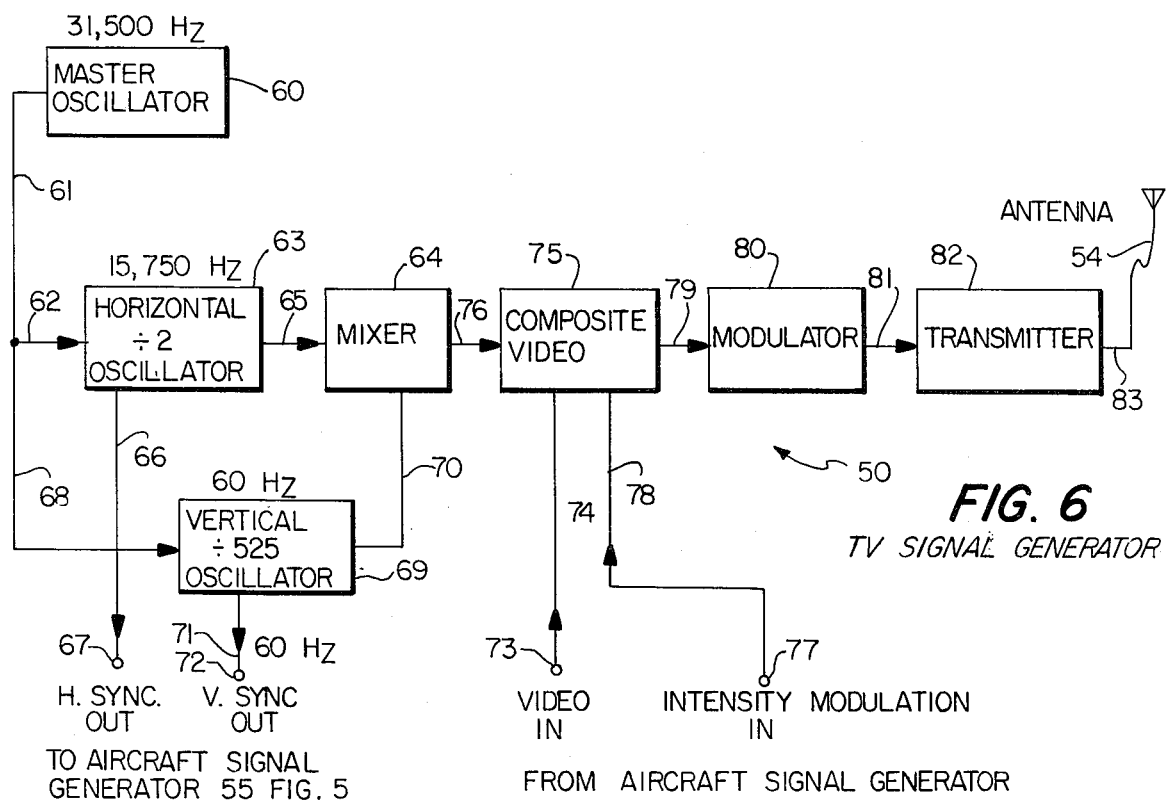
FIG. 6 is a schematic diagram in block form showing further details of the television signal generator portion of FIG. 5.

Before proceeding with a description of the aircraft signal generator 55 and box 92, which includes circuits for special purposes such as stall warning indicators, further details of the television signal generator will be discussed with reference to FIG. 6. The FCC has adopted a set of specified television signals commonly referred to as the NTS system. Among these are a specification for the horizontal frequency of approximately 15,750 Hz. The vertical frequency adopted is approximately 60 Hz. In FIG. 6 these signals are generated by producing a frequency of 31.5 KHz at the master oscillator 60.

The 31,500 Hz signal from the master oscillator 60 is conducted via paths 61 and 62 to the horizontal oscillator 63. The horizontal oscillator 63 divides the 31,500 Hz signal by a factor of 2 to produce the horizontal synchronizing frequency of 15,750 Hz. The horizontal synchronizing signal is fed to the mixer 64 via path 65 and also via path 66 to terminal 67 from where it is supplied to all of the circuits of the flight simulator requiring horizontal synchronization.

The 31,500 Hz signal from the master oscillator 60 is also fed via path 61 and 68 to the vertical oscillator 69. The vertical oscillator performs the function of dividing the 31,500 Hz signal by a factor of 525 to produce a signal of 60 Hz. The division by 525 is usually accomplished in four stages of successive division by factors of 7, 5, 5 and 3, but any technique which will reduce the signal to 60 Hz is satisfactory. The output signal at 60 Hz from the vertical oscillator 69 is conducted via path 70 to mixer 64 and via path 71 to terminal 72. As indicated by its title, the mixer 64 performs a function of mixing the horizontal signal with the vertical signal to produce a composite sync signal. The vertical sync signal is provided at terminal 72 for all of the other circuits of the flight simulator requiring a vertical sync signal.

The video signals which define the aircraft and the landing strips are received from the aircraft signal generator 55 on terminal 73, as shown in FIG. 6, and fed via path 74 to the composite video amplifier 75. The composite video amplifier functions to mix the video signals with the sync signals which are received from the mixer 64 via path 76.

The aircraft signal generator also produces a signal which will vary the intensity of the aircraft with range. These circuits will be described in detail hereinafter. This intensity modulation signal is applied to terminal 77 and conducted via path 78 to the composite video amplifier 75 where it is mixed with other video signals and the composite sync signals.

The output of the composite video amplifier 75 is applied through path 79 to the modulator 80. The output of the modulator is conducted via path 81 to the transmitter 82 where it modulates the RF oscillator. The frequency of the RF oscillator is chosen to coincide with one of the lesser used channels, usually in the low frequency band, of the television receiver. The RF signal is conducted via path 83 to the antenna 54 which in actual practice may be a terminal at the rear of the console, a short piece of wire or even the oscillator itself without any additional coupling means. It is also possible to combine the modulator and transmitter functions into a single transistor stage.

Returning now to FIG. 5, the prior description of the circuits of the television signal generator 50 included the horizontal and vertical sync signals provided on paths 57 and 58 to the aircraft signal generator 55. Also just discussed were the video signals and the intensity modulation signal which were the outputs of the aircraft signal generator provided on paths 84 and 85 as inputs to the composite video mixer 52 of the television signal generator 50.

The video signal which produces the illuminated aircraft symbols 24 and 24a on the face of the television screen is generated and computed by means of analog techniques in unit 55. To describe these techniques broadly, two dc voltages from fixed power supplies are the origin of the signals which represent the aircraft's east-west and north-south position. A third dc voltage from a fixed power supply is the origin of the signal which determines the elevation of the aircraft on the television display. These dc voltages are applied to aircraft controls on the front panel of the operator console 10 which vary the magnitudes of the dc voltages according to the flight of the aircraft. A fourth voltage, obtained from a fixed power supply, is applied to the rudder control. The output of the rudder control is a voltage which represents the analog of the rate of turn of the aircraft. That is, when the aircraft is flying in a straight line, the output signal from the rudder control will be zero, and when the aircraft is making a turn at the maximum rate, the voltage from the control will be a maximum. Unit 86 generates three signals which are speed, rate of turn, and rate of climb. These are conducted on path 88 to the east-west, north-south and elevation vector computer 87. The output of the computer 87 is heading information, and east-west, north-south and elevation vectors. These signals, of course, vary with the flight of the aircraft, and the instantaneous value of the four signals represent the heading, east-west location, north-south location and elevation of the aircraft, respectively. These signals are fed via path 91 to the video generator 90. The video generator 90 serves the purpose of converting the analog signals to signals which are time-synchronized to the raster display of the televison receiver. This is accomplished by varying the time delays of a group of multivibrators in accordance with the magnitudes of the analog signals produced by the computer 87.

Figure 7:
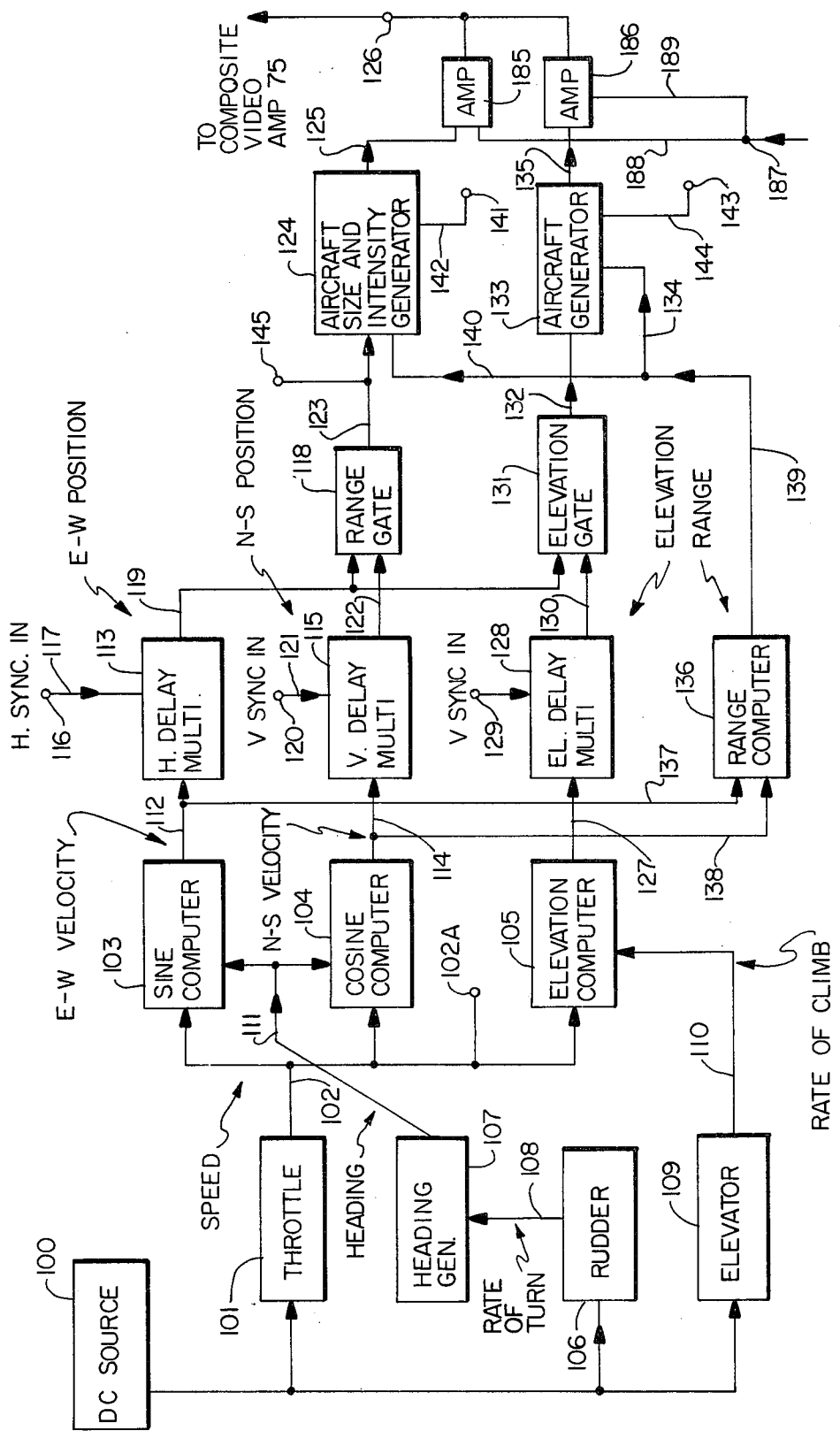
FIG. 7 is a simplified block diagram of the aircraft signal generator of FIG. 5.

FIG. 7 is a more detailed block diagram of the functions included in the aircraft signal generator unit 55 of FIG. 5. The output or outputs of a dc source 100, which may be either a single power supply or several independent power supplies, is fed to the throttle, rudder and elevator controls which are located on the main panel of the operator control unit 10. Each of these controls, whose mechanical configuration will be described hereinafter, consists of a potentiometer whose shaft rotation is controlled by the operator-pilot. The output of the throttle potentiometer 101 is a dc voltage analog of the speed of the aircraft whose value depends upon the operator's setting of the aircraft throttle. The speed analog is conducted via path 102 to the sine, cosine, and elevation computers 103, 104 and 105, respectively. The rudder control 106, whose mechanical configuration will be described hereinafter, is also a potentiometer whose dc voltage analog is proportional to the rate of turn of the aircraft and is under the control of the pilot-operator. The output of the rudder control 106 is applied to the heading generator 107 via path 108. The elevator control 109, whose mechanical configuration will be described hereinafter, is also a potentiometer whose dc voltage output is the analog of the rate of climb of the aircraft. The elevator control and therefore the rate of climb is under the control of the pilot-operator. The dc voltage representing rate of climb is fed to the elevation computer 105 via path 110.

The input to the heading generator 107 is a dc voltage representing rate of turn of the aircraft. The output of the heading generator 107 is a signal representing the heading of the aircraft which is provided on path 111 to the sine computer 103 and the cosine computer 104.

The heading generator 107 receives a dc voltage from the rudder potentiometer 106 on path 108, the dc voltage representing rate of turn of the aircraft. The heading generator 107 converts the rate of turn signal into a signal representing the heading of the aircraft which is delivered via path 111 to both the sine computer 103 and the cosine computer 104. In the preferred embodiment the heading generator 107 is a motor and gear box the rate of rotation (rpm) of which is proportional to the rate of turn signal on path 108. The output of the heading generator is a shaft rotation whose instantaneous position represents the heading of the aircraft. Thus, the output shaft rotation represents the rate of turn of the aircraft and the instantaneous position of the shaft is the analog of aircraft heading.

The output shaft from the heading generator 107 provides the mechanical shaft rotation input to both the sine and cosine computers 103 and 104 which, in the preferred embodiment are continuous rotation sine function and cosine function potentiometers. The electrical signal input to both the sine and cosine potentiometers is the dc voltage on path 102 representing speed. The output signal from the sine computer is a voltage representing east-west velocity which is conducted via path 112 to the horizontal delay multivibrator 113. The signal on path 112 is a steady state dc voltage when the aircraft is flying a straight line at any heading except due north and due south. If the aircraft is flying due north or due south, the signal on signal path 112 is zero. If the aircraft is making a continuous turn, the signal on path 112 is a slowly varying dc voltage whose magnitude is the sine function of the "aircraft speed" signal on path 102.

In a similar fashion the signal output from the cosine computer 104 is a voltage representing the north-south velocity which is conducted via path 114 to the vertical delay multivibrator 115. Horizontal synchronous pulses obtained from terminal 72 (FIG. 6) are applied to terminal 116 (FIG. 7) and applied via path 117 to the horizontal delay multivibrator 113. The horizontal synchronous signal is used to initiate the delay of the multivibrator and the duration of the delay is determined by the magnitude of the east-west velocity signal on path 112 which is applied as a second input to the horizontal delay multivibrator 113. The output of the multivibrator on path 119 is applied to the range gate 118.

In a similar fashion a vertical synchronous pulse obtained from terminal 72 of the vertical oscillator (FIG. 6) is applied to terminal 120 (FIG. 7) and applied via path 121 as an input to initiate the beginning of the vertical delay multivibrator 115. The duration of the delay of the multivibrator is determined by the magnitude of the north-south velocity signal obtained on path 114. The variable width gate generated by the vertical delay multivibrator is applied via path 122 to a second input of the range gate 118. The range gate circuit 118 provides two functions. First, by means of a gate circuit, it combines the signals on paths 119 and 122 so that an output signal from the gate is provided only when both signals are present. The second function of the range gate circuit 118 is to generate an aircraft pulse whose width is chosen at some predetermined value to represent the size of the aircraft 24 and 24a as it is to appear on the television display. The pulse representing the aircraft which has been generated by the circuits of the range gate 118 is applied via path 123 to the aircraft size and intensity generator 124 where the aircraft pulse undergoes further modification. As indicated by its title, the aircraft size and intensity generator 124 performs the two functions of reducing the aircraft size and the aircraft intensity, as it is observed by a viewer of the simulator television display, so that the target begins to fade in both size and intensity as the range increases. This is for the purpose of giving a more realistic display and is particularly advantageous when simulating the flight of model aircraft which in fact are lost on occasion because they can be no longer seen by the observer. The output of the generator 124 is applied on path 125 to terminal 126, through amplifier 185, where it is combined with other signals for application to the composite video amplifier 75 via path 74 and terminal 73 (FIG. 6).

We have thus far discussed the generation of the speed and heading signals which are fed to the sine and cosine computers, the horizontal and vertical delay multivibrators, the range gate and finally the aircraft size and intensity generator, this group of circuits being combined to generate a simulated aircraft 24a which appears on the plan display of the television receiver. The generation of the aircraft symbol 24 which appears on the elevation display of the television receiver as best seen in FIG. 3, will now be discussed with reference again to FIG. 7.

In generating the elevation display aircraft symbol 24, the rate of climb signal appearing on path 110 is fed to the elevation computer 105 where it is combined with the speed signal which is generated by the throttle 101 and fed via path 102 to the elevation computer 105. The function of the elevation computer 105 is to provide a signal whose instantaneous value represents the elevation of the aircraft. This signal is provided on path 127 to the elevation delay multivibrator 128. The vertical synchronous signal which is provided by the vertical oscillator 69 on terminal 72 (FIG. 6) is applied to terminal 129 and supplied to the elevation delay multivibrator 128. The vertical synchronous signal initiates operation of multivibrator 128 and the signal from the elevation computer on path 127 determines the duration of the multivibrator output signal which is supplied on path 130 to the elevation gate 131.

Elevation gate 131 provides the logical function of supplying an output signal on path 132 to the aircraft generator 133 when both the signal on path 119 and the signal on path 130 are present.

The aircraft generator 133 is a multivibrator whose action is initiated by the signal from the elevation gate on path 132 and the duration of which is dependent upon range signal on path 134 obtained from the range computer. The video signal from the aircraft generator 133 is applied via path 135 and through amplifier 186 to terminal 126 where it is connected to terminal 73 and via path 74 to the composite video amplifier 75 (FIG. 6).

The range computer 136 is a summing network provided for the purpose of adding the east-west velocity vector signal, which is obtained from the sine computer 103, with the north-south velocity vector signal obtained from the cosine computer 104, which signals are applied via paths 137 and 138, respectively, to the range computer 136. The output of the range computer 136 is applied via paths 139 and 134 to the aircraft generator 133 and via path 140 to the aircraft size and intensity generator 124.

Figure 8:
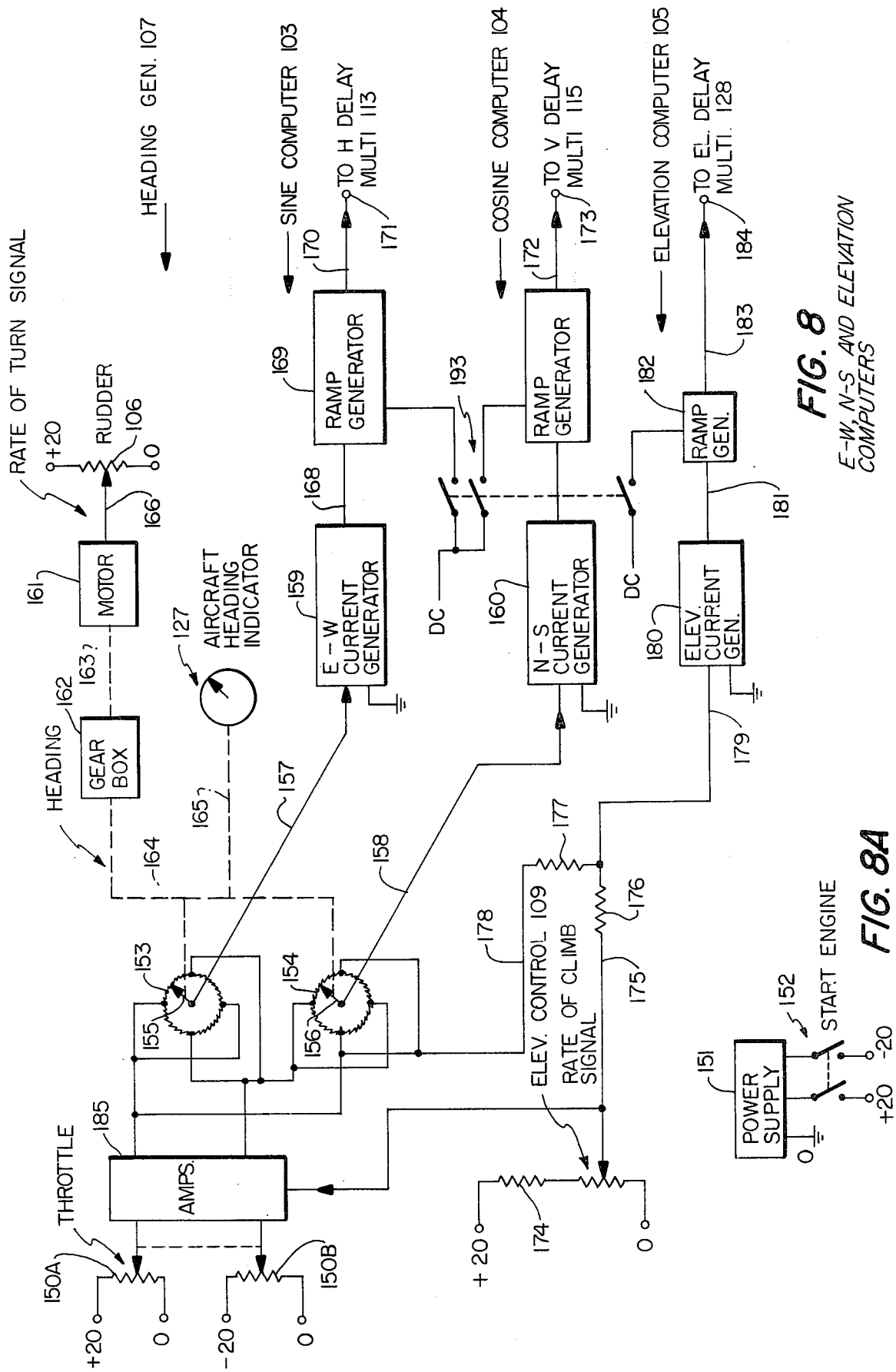

Further details of the heading generator 107, sine computer 103, cosine computer 104 and elevation computer 105 are shown in FIG. 8. In the upper left-hand corner of FIG. 8 are shown two potentiometers 150a and 150b which comprise the throttle indicated generally as 101. The two potentiometers 150a and 150b are connected to +20 volt and −20 volt power supplies, respectively. The interconnection of the throttle controls with the power supply 151 and the start engine switch 152 are shown in FIG. 8a. The output signals from the movable contacts of potentiometers 150a and 150b, which signals represent the speed of the aircraft and therefore vary together with the setting of the throttle control 101, are applied to the terminal of the sine and cosine potentiometers 153 and 154, respectively.

The connections are made to the sine function generator 153 so that the east-west signal obtained from the movable contact or swinger 155 of the sine function generator is a maximum positive voltage when the swinger is in the East quadrant, zero when the swinger is in the North quadrant, a maximum negative voltage in the West quadrant, and, finally, zero voltage when the swinger is in the South quadrant. In a similar fashion, but with a phase shift of 90°, the cosine function generator 154 is interconnected to the positive and negative power supplies such that the output of the swinger 156 is a maximum positive voltage when the swinger is in the north quadrant, zero in the west quadrant, maximum negative voltage in the south quadrant, and, finally, is zero in the east quadrant. The output signals which are obtained from the sine and cosine function generators 153 and 154 at terminals 155 and 156, respectively, are conducted via paths 157 and 158 to the east-west constant current generator 159 and to the north south current generator 160, respectively.

The rotation of the swingers 155 and 156 is produced by motor 161, by gearbox 162 which is drive by motor 161. Motor 161 is connected to gear box 162 with shaft 163 and the output of the gear box 162 is connected to the sine and cosine potentiometers 153 and 154 by means of shaft 164. The rate at which the heading of the aircraft changes, as represented by the position of the swingers 155 and 156 of the sine and cosine potentiometers 153 and 154, respectively, is determined by the rotational speed of the motor which in turn is determined by the voltage applied by the rudder control 106 via path 166 to the motor. During the time when the shaft 164 and therefore the sine and cosine potentiometers make one complete revolution, the aircraft 24a as viewed on the television screen will appear to make one complete circle. An aircraft heading indicator 167, which is located on the front panel of the simulator control unit 10, is attached to the gear box 162 by means of shafts 164 and 165.

The sine computer 103 functions in an identical manner to the cosine computer 104, except that the input and output signals and certain time constants differ. Therefore, only the sine computer will be described in detail. As indicated before, the input signal for the current generator 159 is attained from the swinger 155 of the sine potentiometer 153 via path 157. The current generator 159 functions to convert the voltage signal on path 157 to a current signal on path 168 wherein the current is proportional to the voltage.

It is the requirement of the horizontal positioning circuit, which is comprised of east-west current generator 159 and ramp generator 169, to generate an east-west voltage or horizontal position of the airraft on the TV display. This voltage is later used to control the delay of a multivibrator, the delay controlling the position of the aircraft video signal on the chosen horizontal sweep of the TV raster. If the magnitude of this east-west voltage were plotted against time, one would see a waveform where the slope represents the aircraft's east-west speed (as contrasted with vector or ground speed), the voltage on the vertical axis is the aircraft's position and the horizontal time axis is the time required for the aircraft to move from one position to another.

This east-west voltage ramp is generated by controlling the charge on a capacitor. As is well known, a capacitor charging from a fixed voltage through a series resistor charges at an exponential rate while a capacitor charging from a constant current source charges at linear or constant rate. Current generator 159 controls the current flowing into the capacitor of the ramp circuit 169 in proportion to the magnitude of the east-west speed on path 157, i.e., if the east-west speed is constant, the charging rate and therefore the slope is constant, and if the east-west speed varies, then the charging rate and the slope both vary.

The output signal from the ramp generator 169 is either a positive going or a negative going sawtooth depending upon the position of the sine potentiometer 153, wherein the slope of the sawtooth represents the speed of the aircraft in the east-west direction, and the instantaneous value at any point in time represents the location of the aircraft on the television screen in the east-west direction.

Referring now to the cosine computer 104, which functions in the same manner as the sine computer 103, the signal on path 172 which is applied to terminal 173 is a sawtooth waveform, either positive or negative going depending upon the position of the cosine potentiometer 154, and the slope of the sawtooth represents the speed of the aircraft in the north-south direction, and the instantaneous value of the sawtooth represents the location of the aircraft at any point in time. The sawtooth waveforms from terminals 172 and 173 are connected to the horizontal delay multivibrator 113 and to the vertical delay multivibrator 115, respectively.

The elevation computer which is shown as a single box 105 in FIG. 7 is shown in further detail in FIG. 8. The source of the elevation signal is the elevator control 109 which is connected to the low voltage terminal of power supply 151 at one end and in a series circuit relationship through resistor 174 on the other end. Resistor 174 is in turn connected to the +20 volt terminal of the power supply. The function of this resistor is to reduce the range of the elevator control to adjust the scale factor to a suitable range. The rate of climb output signal from the elevator control 109 is applied via path 175 to the summing network comprised of resistors 176 and 177. The second signal applied to the summing network is the positive signal representing the speed of the aircraft which is obtained via path 178 to resistor 177. The sum of these two signals which is obtained at the junction of resistors 176 and 177 is applied to path 179 to the elevation current generator 180. The output of the elevation current generator 180 is applied through path 181 to the ramp generator 182 and finally through path 183 to terminal 184. The elevation signal is connected from terminal 184 to the elevation delay multivibrator 128 as shown in FIG. 7. If desired, a circuit 185 can be included to alter the effect of the speed signal so that aircraft speed during a dive is greater than during a climb at any specific throttle setting.

In general, the function of the current generator 180 and the ramp generator 182 is the same as the current generator and ramp generator 159 and 169 of the sine computer 103. The sawtooth waveform of the elevation generator, however, is only positive going and the slope of the signal represents the rate of climb and the instantaneous value represents the elevation of the aircraft signal 24a above sea level as seen on the face of the television display.

Referring now back to FIG. 5, it will be seen that the television signal generator 50 and the aircraft signal generator 55 have been discussed. In the following section, the circuits of the landing field generator 56 are discussed.

The circuits of the landing field generator, box 56 of FIG. 5, produce the video signals which present displays representing the landing strips 17–19, 17a–19a, 27–30 and location boxes 31 and 32, all as seen in FIG. 4, on the television receiver 11. While elements 17a–19a function operatively as landing strips, from a circuit standpoint they are very similar to location boxes 31 and 32. Therefore, the circuits for landing strips 17–19 and 27–30 are discussed as one circuit, and landing strips 17a–19a are discussed with location boxes 31 and 32.

Figure 9:
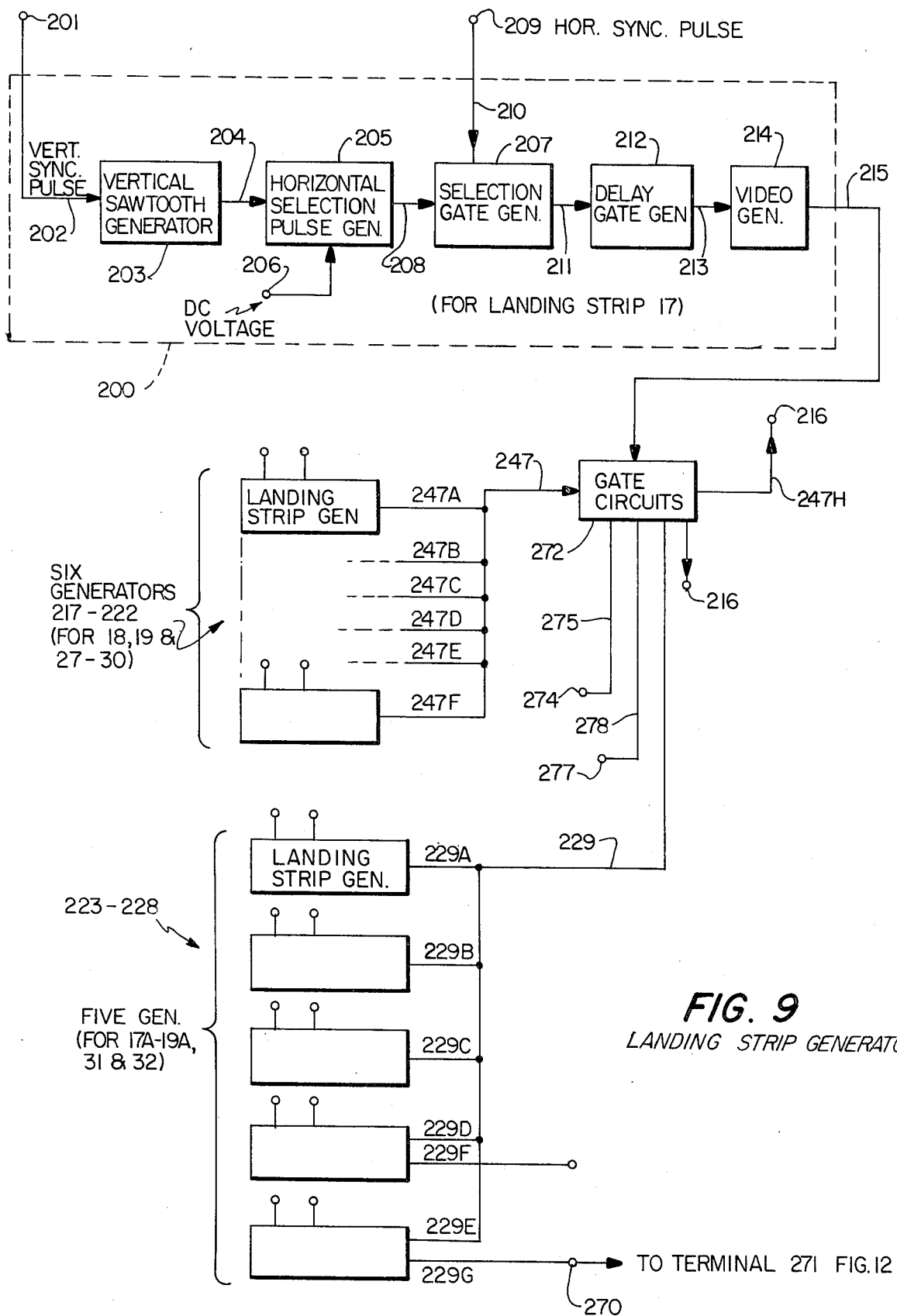
FIG. 9 is a schematic diagram in block form of the landing strip signal generator shown in FIG. 5.

Referring now to FIG. 9, the landing strip generator 200 generates the video signal which produces the illuminate landing strip 17 on the television receiver 11. A vertical synchronous pulse received on terminal 201 from terminal 72 of television signal generator 50 is conducted on path 202 to the vertical sawtooth generator 203. The sawtooth has a duration of approximately 1/60 second and coincides with one scan of one raster frame on the television receiver. The vertical sawtooth from generator 203 is conducted on path 204 to the horizontal selection pulse generator 205. The pulse generator 205 produces a trigger signal when the magnitude of the slowly increasing vertical sawtooth, which is provided on path 204, reaches a predetermined level if dc voltage which is provided on terminal 206 and conducted to the pulse generator 205. The selection pulse from pulse generator 205 is applied via path 208 to the selection gate generator 207.

Selection gate generator 207 produces a gate having a time duration equal to the time duration of one horizontal period of the television raster. The selection gate is initiated by the selection pulse which has been generated by the pulse generator 205 and conducted via path 208 to the gate generator 207. A two-legged AND gate, also included in box 207, functions to select a particular horizontal sync pulse which is applied on terminal 209 and path 210 to selection gate 207. The horizontal sync pulses provide on terminal 209 are applied to one leg of the AND gate and the selection gate generated by circuit 207 is applied to the other leg of the AND gate. When the two coincide, a single horizontal synchronous pulse is selected and conducted via path 211 to the delay gate generator 212.

The delay gate generator 212 is a monostable multivibrator with a predetermined time delay equal to approximately three-fourths of a horizontal time period. A differentiation circuit included as part of generator 212 forms a trigger pulse at the trailing edge of the delay gate. This newly formed pulse is conducted via path 213 to video generator 214.

The video generator 214 is also a monostable multivibrator triggered by the trailing edge pulse on path 213 and having a timed duration of approximately 1/10 of a horizontal period. The video generator produces a pulse which is initiated when the horizontal sweep on the television set, for example, is approximately three-fourths of the way across the television raster and lasting for approximately 1/10 of the distance. This pulse, when applied through path 115 to terminal 16 and applied to the video end terminal 73 and via path 74 to the composite video amplifier 75, as best seen in FIG. 6, is processed by the modulator 80, transmitter 72 and finally transmitted via the antenna to the television set 11 and produces the illuminated landing strip 17 as seen in FIG. 3.

Except for the duration of the various gates, which determine the position and duration of the various landing strips, the six generators 217–222 are identical to the landing strip generator 200 just described. Generators 217–222 generate landing strips 18, 19, and 27–30, respectively. The pulses produced by generators 217–222 are conducted via path 247, through box 272, to terminal 216 where they are connected to the composite video amplifier 75.

In the previous paragraphs the method was described by which a single horizontal pulse was selected by the horizontal selection pulse generator 205 and the selection gate generator 207. The generators 223–228, which produce the landing strips 17a–19a and the location boxes 31 and 32, are substantially the same as the landing strip generator 200 except that the selection gate generated by box 207 has been increased in width or duration so that it selects a number of horizontal pulses, for example, eight, which causes the landing strip as seen on the television display, to have some height, for example, eight lines high. With the further exception relating to the duration of the delay gate generator and the duration of the video generator, the generators 223–228 are the same as the circuits described for the landing strip generator 200. The output from the signal generators 223–228 are conducted via a multiconductor cable 229 to terminal 216 through box 272 and finally via terminal 73, and path 74, to the composite video amplifier 75 (FIG. 6).

Figure 10:
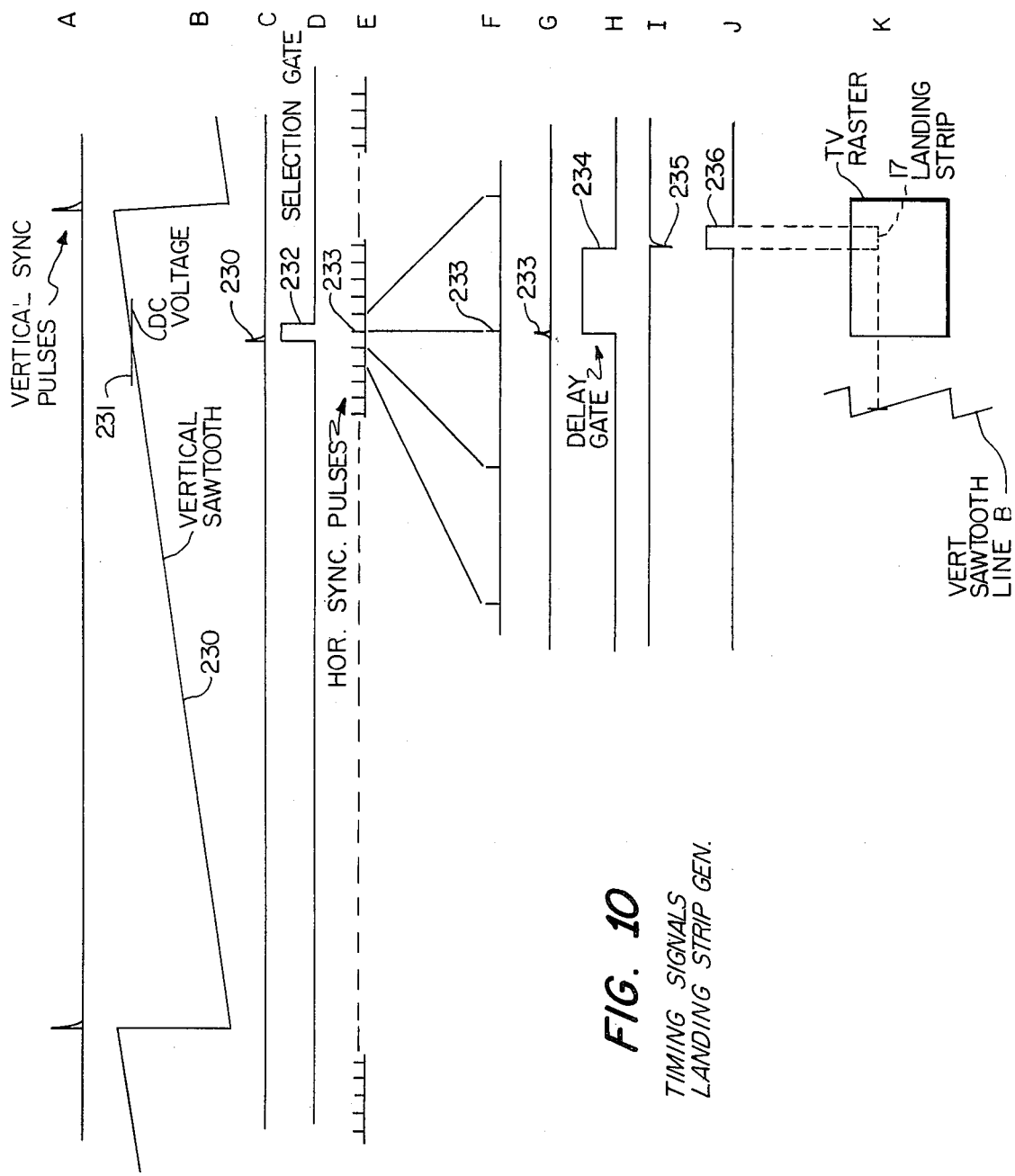

FIG. 10 is a series of waveform and timing diagram for the signals just described in relation to the landing strip generator 200. In line A is shown two vertical synchronous pulses separated in time by 1/60 second. Line B shows the vertical sawtooth 230 and superimposed thereon, a dc voltage 231. At the instant in time when the magnitude of the vertical sawtooth is equal to the magnitude of the dc voltage, a pulse 230 is generated which is shown on line C. Pulse 230 is applied to a monostable multivibrator to produce a gate 232 of predetermined width, in this case the width is equal to the time between two horizontal synchronous pulses. On line E there is shown a group of horizontal synchronous pulses representing a total of 256 pulses in the normal television raster single scan. It will be noticed that the horizontal synchronous pulse 232 falls within the time duration of gate 232 shown on line D. Line F shows four horizontal synchronous pulses, on an expanded scale, with pulse 232 again shown as the selected horizontal pulse. Line H, which is also shown on an expanded scale, is the delay gate 234 which is initiated by the selected horizontal pulse 232 as shown in line G. Pulse 235, shown on line I is obtained from the trailing edge of delay gate 234. The video signal 236, as shown in line J, is initiated by pulse 235. Finally, the diagram on line K shows how the video signal 236 determines the horizontal position of landing strip 17 and the way in which the signals described on line D determine the vertical position.

Referring now to FIG. 11, the stall warning indicator 251 is operated by the differential amplifier 252 which is connected to the indicator via path 253. The aircraft speed voltage which is obtained from path 102 (FIG. 7) is applied to terminal 254 of FIG. 11 and via resistor 255 and path 256 to one input of the differential amplifier 252. A dc voltage of predetermined magnitude is applied to terminal 257 and via resistor 258 and path 259 to the other input of the differential amplifier 253. The parameters of the differential amplifier are so chosen that as long as the speed voltage on path 256 is greater than the preset stall voltage on path 259, the stall warning 251 will not be activated. As soon as the speed voltage is decreased below that preset value of the stall voltage on path 259, the stall warning indicator is activated. A landing gear switch 260 is interconnected with resistor 261 and via path 262 to path 256 at the input to the differential amplifier. When switch 260 is closed, indicating that the landing gear is down, the speed voltage is reduced, for this circuit, thus effectively causing the stall warning indicator to be activated at a lower aircraft speed. In a somewhat similar fashion the flaps-down switch 263, resistor 264 and path 265, are connected to the other input of the differential amplifier in such a way that the stall warning voltage is decreased with the flap switch 263 in the closed position. This effectively allows the aircraft to "fly" at a lower speed when its flaps are down without activating the stall warning indicator.

MODE SWITCHING

The two modes in which the flight simulator operates have been previously described. Those modes are enroute sector and take off and landing. In this section the circuits which switch from one mode to the other, either automatically or manually, are discussed.

Functionally, two changes occur when switching from enroute sector to take off and landing. First the landing strips and location boxes are changed, i.e., landing strips 27–30 are substituted for landing strips 17–19 and 19a and in addition location boxes 31 and 32 are substituted for boxes 17a and 18a, the effect being to change the appearance of the environment. The second is to change the scale factor so that the aircraft appears to move faster on the television screen as observed by the pilot operator.

Actual changeover from one mode to another is accomplished by the combination of the coincidence circuits 284 and the gate circuits 272 as shown in FIG. 12. Automatic changeover occurs when there is coincidence formed between a first aircraft signal 24a obtained from terminal 145 of FIG. 7 and applied via path 286 at terminal 285 to coincidence circuit 284 with a location box signal 32 obtained from terminal 270, FIG. 9, and applied to terminal 271 to the coincidence circuit 284. When coincidence occurs between the aircraft signal and the coincidence box, i.e., the aircraft 24a is flown into box 32, indicating that the aircraft has successfully taken off, a signal out of the coincidence circuit 284 disables gates 287a–f and enables gates 288a–f. The enabling signal which appears as an output of coincidence circuit 284 via path 273, terminal 274 and path 275 to gates 287a–f is switched, as a result of the coincidence between the aircraft's signal 24 and the location box 32, to path 276, terminal 277, and path 278 to gate 288a–f, which then become enabled. The signals for landing strips 17–19 and 17a–19a, as best seen in FIG. 4, and which are available on paths 215, 247a, 247b, 229a, 229b and 229c, as best seen in FIG. 9, are applied via terminals 290a–f to gates 288a–f and when the gates are enabled, those signals applied to terminal 216 as video signals to the composite video amplifier 75 via terminal 73 and path 74 as best seen in FIG. 6. When the takeoff and landing gates 287a–f are enabled, the landing strips 27–30 and the location boxes 31 and 32, as seen in FIG. 4, and which are available as electronic signals on paths 247c–f and 229d–e, as best seen in FIG. 9, are applied through terminals 291a–f to gates 287a–f and finally to terminal 216 to the composite video amplifier 75 via terminal 73 and path 74, as best seen in FIG. 6, thus producing the appropriate takeoff and landing display on the television receiver.

The same switchover from takeoff and landing to enroute sector modes can be accomplished manually by the closing of switch 281. The closing of switch 281 applies a dc voltage, which is obtained from the power supply, to terminal 283 and, via resistor 282 and switch 281, to the coincidence circuit 284 which disables gates 287a–f and enables gates 288a–f. The description above covers the first functional requirement of changeover from takeoff and landing to enroute sector mode. As mentioned previously, the second functional requirement is to change the scale factor of the television display. This is accomplished by changing the gain of an amplifier in each of the paths of the aircraft signals 24 and 24a. These amplifiers are 185 and 186 (FIG. 7). The gain of the amplifiers is changed by applying a dc signal to terminal 187 and, via paths 188 and 189, to amplifiers 185 and 186, respectively. This signal, which changes the gain of the amplifier, is obtained from the coincidence circuit 284 which is applied via path 279 and terminal 288 as best seen in FIG. 12. When the gain of the amplifiers is increased, it has the effect of increasing the size of the aircraft as if it were being viewed at closer range, and it performs the function of relocating the aircraft on the television display because the television display is now portraying a smaller sector of the landscape.

The next section of the specification will describe the controls and displays on the operator control unit 10. The description will include the function of the controls, and their relation to the electronic circuits of the flight simulator.

Altimeter 401 displays the altitude of the aircraft in feet above sea level. It is comprised of a digital voltmeter and is connected to terminal 184, FIG. 8. The stall warning indicator 251 is a yellow light and its operation has been fully described in relation to FIG. 11. Light 402 is a red crash indicator. It is activated when the pilot operator has committed some serious blunder. For example, as shown in FIG. 13, the indicator 402 is connected with a signal available on terminal 252a of FIG. 11, which is applied via terminal 403, path 404, delay 405, path 406 to the red indicator 402. The delay 405 is activated by the stall warning signal. If after a predetermined delay of, for example, 30 seconds, the pilot operator has not increased the speed of the aircraft and thereby eliminated the stall warning signal, the crash light is energized. A second signal on path 412 will also activate the crash indicator 402. This signal is generated when the coincidence circuit 411 is activated by coincidence between the aircraft 24a and the sides of the landing strips 28 and 29 (FIG. 4). The signal from the aircraft is available on terminal 145 of FIG. 7 and is applied to terminal 407 and via path 408 to coincidence circuit 411. The sides of the landing strip are available on terminals 291b–c as seen in FIG. 12 and are applied to terminal 409 and conducted via path 410 to coincidence circuit 411.

Indicator 421 is a light which flashes blue if the landing gear has not been lowered when the aircraft is below a predetermined elevation above sea level. The circuit performing this function is shown in FIG. 14 and consists of a differential amplifier with one leg being connected to the elevation voltage which is available at terminal 143, as best seen in FIG. 7. The elevation voltage is connected to the differential amplifier by means of terminal 421 and path 422. The second leg of the differential amplifier 423 is connected to a dc voltage available from the power supply and applied to terminal 424 and via resistor 425 and path 426 to the second input of the differential amplifier 423. The output of the differential amplifier is conducted via path 427 to the indicator 421. The action of the differential action of the differential amplifier is disabled by grounding path 426 which is attached to terminal 428 which in turn is connected to the landing gear switch 260 via terminal 292 as best seen in FIG. 11. The parameters of the differential amplifier 423 are so chosen that the indicator 421 is activated when the aircraft sea level elevation is less than 500 feet unless the landing gear switch is down which is indicated by the closing of switch 260 thus grounding terminal 423. An audio alarm may also be activated at the same time the indicator 421 is activated by connecting the audio alarm in parallel with the indicator 421.

Digital clock 431 is self-contained and does not interconnect with any of the circuits of the flight simulator. Device 167 indicates the heading of the aircraft and is directly connected via shaft 165 and is driven by motor 61 as shown in FIG. 8.

Device 432 indicates the speed of the aircraft. It is a self-contained digital voltmeter and obtains its signal representing the speed of the aircraft from throttle 101 via path 102 and terminal 102a as shown in FIG. 7. If necessary, a variable resistor, not shown, may be inserted between the speed indicator 432 and the source of potential 102a in order to adjust the scale factor of the meter.

On the lower horizontal surface of the control unit 10 are located four switches. Switch 152 is the START ENGINE switch and is interconnected as shown in FIG. 8a. Switch 263 is the flaps switch and is interconnected as is shown in FIG. 11. Switch 260 is the landing gear switch and is interconnected as shown in FIG. 11. The manual mode selection switch 281 is interconnected as shown in FIG. 12. The throttle control 101 is interconnected as shown in FIG. 8. The rudder control 106 is combined with the elevator control 109, both as shown in FIG. 8. The actual controls usable for the panel are in the nature of rods or sticks suitably gimballed in housings with the lower end of each rod being mechanically coupled to the movable portions of potentiometers so that manual displacement of the rods causes a change in potentiometer resistance. Such devices are available in a variety of designs and price ranges, and do not, in themselves, form a part of this invention. As one example, reference is made to page 38 of the Heathkit Assembly Manual for a Model GDA — 505-D Five Channel Digital Proportional Radio Control Transmitter published in 1975 by the Heath Company, Benton Harbor, Mich. In that specific device the control sticks are movable in various directions, a desirable characteristic.

On the lower front panel of the operator control unit 10 are located an initializing switch 193 which is interconnected as shown in FIG. 8 which performs the function of initially setting the location of the aircraft in both East-West and North-South directions as well as elevation, so that the aircraft always starts from a predetermined location on the television display. The remaining switch 433 is for control of the power to the operator control unit 10 including the various power supplies, not shown, for the electronic circuits of the simulator.

FIG. 15 shows a diagram which, for ease of understanding can be compared with FIG. 8 and which shows a technique by which aircraft signals can be, if desired, developed using digital apparatus. As shown therein, a signal from the movable contact of potentiometer 150A, representative of speed, is connected to an analog-to-digital converter 450, which performs the A to D conversion in a conventional manner. Similarly, the rathe of climb signal from potentiometer 109 and the rate of turn signal from potentiometer 106 are connected to analog-to-digital converters 451 and 452, respectively, which converters also produce outputs in digital form. The digital outputs of converters 450, 451 and 452 are then connected to a digital processor or computer 453 which produces horizontal, vertical and elevation delay control signals in digital form, these signals being conducted to conventional digital-to-analog converters 454, 455 and 456, respectively, which converters return the signals to analog form. The resulting analog signals are then handled by the remaining apparatus as previously described.

Processor 453 can employ conventional devices to compute these delay signals and can use the same principles described in connection with FIG. 8, but in a digital manner. Alternatively, a full scale scientific computer can be used.

Before describing one digital system for producing the required signals, it should be noted that the analog and digital devices both solve the same basic equation which is $$P_f = P_i + _\Delta P$$

This simply states the final or present position of the aircraft is obtained by adding the initial position to the change in position. In somewhat more detail this may be written $P_f = P_{ih} + V \cos H$ to obtain the horizontal position. This states that the final position of the aircraft in the horizontal direction is obtained by adding the change in position to the initial horizontal position and further that the change in horizontal position is obtained by multiplying the speed of the aircraft $V$ by the cosine of the heading angle $H$.

These equations when employed with the equipment of FIG. 15 operate as follows.

The digitized rate of turn signal obtained from rudder control 106 and A/D 452 is applied as an input to the processor which is first required to solve the equation $$H_f = H_i + R_i T$$

where:
 $H_f$ = final heading
 $H_i$ = initial heading
 $R$ = rate of turn and
 $T$ is the rate at which the signal is updated and is 1/60 in the case of a standard television receiver.

Now, having the aircraft heading for display to the pilot-operator on display 457, and for use in further signal processing, the processor is required to solve two further equations:

$$P_{fh} = P_{ih} + V \cos H$$

and $$P_{fv} = P_{iv} + \sin H$$

where $P_{fh}$ and $P_{fv}$ are the final horizontal positions and the final vertical position respectively.

$P_{ih}$ and $P_{iv}$ are the initial horizontal positions and the initial vertical position, respectively.

$V$ is aircraft speed obtained from throttle control 101 and A/D 450.

Cos $H$ and Sin $H$ are Cos and Sin of the headings angle, respectively.

$T$ is the rate at which the data must be updated.

Once these simple equations are solved, the digital signals $P_{fh}$ and $P_{fv}$ representing the solution are fed to digital-to-analog converters 454 and 455, respectively. The slowly varying dc voltages from D/A 454 and 455 appear on terminals 171 and 173, respectively, where they are connected to horizontal delay multivibrator 113 and vertical delay multivibrator 173, respectively. The operation of the balance of the circuits remain as described in relation to other figures.

In a similar fashion the processor is required to solve the equation $$E_f = E_i + R_{oc} T$$

where:

$E_f$ = final elevation.
$E_i$ = initial elevation.
$R_{oc}$ = rate of climb.
$T$ = rate of updating the data.

The signal representing the solution is fed in digitized form to D/A 456 and in analog form to terminal 184 which is connected to elevation delay multivibrator 128.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for use in combination with a television receiver for producing a controllable display simulating the flight of an aircraft comprising
    control means coupled to said receiver for producing signals to which said receiver is responsive to produce fixed and movable display marks on said screen, said control means including
    sync circuit means for generating vertical and horizontal sync signals consistent with the raster pattern of said receiver;
    first circuit means for generating signals to which said receiver is responsive to simultaneously produce on said screen first and second symbols representative of an aircraft with one of said symbols being displayed in an upper portion of said screen and the other being displayed in the remaining lower portion of said screen;
    second circuit means for generating signals to which said receiver is responsive to produce on said screen third and fourth symbols representative of a landscape feature, said third and fourth symbols being displayed respectively in said upper and lower portions;
    said first circuit means including variable circuit means for changing the time of generation of said signals generated thereby to concurrently change the horizontal location of said first and second symbols to produce the appearance of motion of said symbols in a horizontal direction, and to independently change the vertical locations of said first and second symbols in said upper and lower portions; and
    manually movable control means mechanically coupled to said variable circuit means for enabling an operator to control the direction of movement of said first and second symbols.

2. An apparatus according to claim 1 and further comprising
    a transparent overlay attachable to the display screen of said receiver to substantially cover said screen, said overlay having indicia thereon dividing said screen into said upper portion and said lower portion.

3. An apparatus according to claim 2 wherein said upper portion is representative of aircraft motion in vertical planes and said lower portion is representative of aircraft motion in horizontal planes.

4. An apparatus according to claim 3 wherein said overlay includes
    indicia on said upper portion representing the vertical appearance of topographical features of a landscape, and
    indicia on said lower portion representing a plan view of the same topographical features represented in said upper portion.

5. An apparatus according to claim 4 wherein said overlay further includes
    elevation calibration indicia on said upper portion and direction indicating indicia on said lower portion.

6. An apparatus according to claim 1 wherein said second circuit means includes
    means for changing the size of said symbols representative of a landscape feature to enlarge the appearance of said feature.

7. An apparatus according to claim 6 wherein said first circuit means includes
    means for changing the scale factor of said display.

8. An apparatus according to claim 6 wherein said second circuit means includes
    means for generating a signal to which said receiver is responsive to produce on said screen visible indicia defining a region through which said movable symbol can be moved, and
    means responsive to the intersection of said movable symbol and said region for changing the size of said symbols representative of a landscape feature to decrease the apparent size thereof.

9. An apparatus according to claim 1 and further comprising
    circuit means responsive to said first and second circuit means for producing an output signal whenever said movable symbol intersects a symbol representative of a landscape feature, and
    means responsive to said output signal for activating an alarm evidencing said intersection.

10. An apparatus for use in combination with a television receiver for producing a controllable display simulating the flight of an aircraft comprising
    control means coupled to said receiver for producing signals to which said receiver is responsive to produce fixed and movable display marks on said screen, said control means including sync circuit means for generating vertical and horizontal sync signals consistent with the raster pattern of said receiver;
    first circuit means for generating signals to which said receiver is responsive to simultaneously produce on said screen first and second symbols representative of the same aircraft with one of said symbols being displayed in an upper portion of said screen and the other being displayed in the remaining lower portion of said screen;

second circuit means for generating signals to which said receiver is responsive to produce on said screen third and fourth symbols representative of the same landscape feature, said third and fourth symbols being displayed respectively in said upper and lower portions;

said first circuit means including
  means for producing signals representative of aircraft speed, rate of turn and rate of climb,
  computing means responsive to said speed, rate of turn and rate of climb signals for generating signals representative of east-west velocity, north-south velocity, elevation and range,
  third circuit means responsive to the signals generated by said computing means and responsive to said vertical and horizontal sync signals for producing display video signals representing aircraft position and motion on said television screen.

11. An apparatus according to claim 10 wherein said means for producing signals representative of aircraft speed, rate of turn and rate of climb includes
  first manually variable means for producing first and second voltages representative of aircraft speed;
  second manually variable means for producing a signal representative of aircraft rudder position; and
  third manually variable means for producing a signal representative of aircraft elevator position.

12. An apparatus according to claim 10 wherein said computing means includes
  manually variable means for producing first and second voltages representative of aircraft speed;
  first potentiometer means having a movable contact for receiving said first and second voltages representative of aircraft speed;
  second potentiometer circuit means having a movable contact for receiving said first and second voltage and for producing a signal representative of the cosine of said voltage; and
  means responsive to said signal representative of rudder position for concurrently moving said movable contacts of said first and second potentiometer means.

13. An apparatus according to claim 10 wherein said third circuit means includes
  first, second and third storage circuit means for accepting said signals representative of east-west velocity, north-south velocity and elevation, respectively, and for respectively producing signals representative of east-west position, north-south position and elevation position.

14. An apparatus according to claim 13 wherein each of said first, second and third storage circuit means includes
  current generator circuit means for producing a current signal proportional in magnitude to the magnitude of the voltage supplied to it; and
  ramp generator circuit means for receiving the current signal produced by said current generator circuit means and for producing a ramp signal the instantaneous magnitude of which is representative of aircraft position and the slope of which is representative of vector speed.

15. An apparatus according to claim 10 wherein said third circuit means includes
  circuit means for establishing initial signal levels to thereby establish the initial position of said aircraft.

16. An apparatus according to claim 10 wherein said computing means and said third circuit means are digital devices, said apparatus further comprising
  analog to digital converter means for converting said voltage signals to said computing means into digital form; and
  digital to analog converter means for converting the digital outputs of said third circuit means into analog form.

17. An apparatus according to claim 10 and further comprising
  means for indicating simulated aircraft heading,
    said means having a rotatable indicator and an azimuth dial adjacent said indicator; and
  means for coupling said movable indicator to said means for concurrently moving said contacts of said first and second potentiometer means so that said indicator is positioned thereby.

* * * * *